United States Patent
Teringl et al.

(10) Patent No.: US 11,885,312 B2
(45) Date of Patent: Jan. 30, 2024

(54) WIND TURBINE WITH AT LEAST ONE DYNAMOELECTRIC MACHINE WITH COOLING CHANNEL IN WINDING INSULATION AND CAN

(71) Applicant: Flender GmbH, Bocholt (DE)

(72) Inventors: Claus Teringl, Pocking (DE); Michael Winklhofer, Pocking (DE)

(73) Assignee: Flender GmbH, Bocholt (DE)

( * ) Notice: Subject to any disclaimer, the term of this patent is extended or adjusted under 35 U.S.C. 154(b) by 0 days.

(21) Appl. No.: 18/020,704

(22) PCT Filed: Aug. 10, 2021

(86) PCT No.: PCT/EP2021/072307
§ 371 (c)(1),
(2) Date: Feb. 10, 2023

(87) PCT Pub. No.: WO2022/034105
PCT Pub. Date: Feb. 17, 2022

(65) Prior Publication Data
US 2023/0243339 A1    Aug. 3, 2023

(30) Foreign Application Priority Data
Aug. 10, 2020   (EP) .................................... 20190188

(51) Int. Cl.
*F03D 9/25*   (2016.01)
*H02K 1/20*   (2006.01)
(Continued)

(52) U.S. Cl.
CPC ................. *F03D 9/25* (2016.05); *H02K 1/20* (2013.01); *H02K 3/345* (2013.01); *H02K 9/197* (2013.01);
(Continued)

(58) Field of Classification Search
CPC ............ H02K 3/34; H02K 3/345; H02K 3/24; H02K 9/19; H02K 9/193; H02K 9/197; H02K 1/20; F03D 9/25
See application file for complete search history.

(56) References Cited

U.S. PATENT DOCUMENTS 4,994,700 A    2/1991  Bansal et al.
2007/0176509 A1  8/2007  Kalsi et al.
(Continued)

FOREIGN PATENT DOCUMENTS

DE            24 62 150          9/1976
DE       102011012454 A1 *   8/2012  ............. H02K 16/04
(Continued)

OTHER PUBLICATIONS

Malischweski (DE 102011012454 A1) English Translation (Year: 2012).*
(Continued)

*Primary Examiner* — Tulsidas C Patel
*Assistant Examiner* — Robert E Mates
(74) *Attorney, Agent, or Firm* — Henry M. Feiereisen LLC (57) ABSTRACT

A wind turbine includes a dynamoelectric machine including a liquid-cooled stator and a rotor interacting with one another. The stator includes a magnetically conductive body and a winding system which is embedded in slots of the magnetically conductive body and which includes a main insulation arranged between a conductor of the winding system and a slot wall and including at least one recess provided in a cooling-channel impression of the main insulation to form at least one axial cooling channel extending between the main insulation and the slot wall, so that the at least one cooling channel borders the slot wall without insulation in direct contact with the slot wall. The winding (Continued)

system includes end windings which are also liquid-cooled. A can separates the stator and the rotor from one another and enables different cooling media for the stator and the rotor.

14 Claims, 5 Drawing Sheets

(51) Int. Cl.
  *H02K 3/34* (2006.01)
  *H02K 9/197* (2006.01)
  *H02K 15/10* (2006.01)
  *H02K 3/24* (2006.01)

(52) U.S. Cl.
  CPC .......... *F05B 2220/706* (2013.01); *H02K 3/24* (2013.01); *H02K 15/105* (2013.01)

(56) References Cited

U.S. PATENT DOCUMENTS

| | | | | |
|---|---|---|---|---|
| 2010/0052325 A1* | 3/2010 | Perner | ................ | F03D 9/25 290/55 |
| 2011/0291423 A1* | 12/2011 | Germishuizen | .... | H02K 15/0037 290/55 |
| 2020/0153306 A1* | 5/2020 | Uhlmann | ................ | H02K 3/24 |
| 2020/0204022 A1 | 6/2020 | Karmaker et al. | | |
| 2020/0336034 A1* | 10/2020 | Hengge | .................... | H02K 3/30 |

FOREIGN PATENT DOCUMENTS

| | | | | |
|---|---|---|---|---|
| DE | 10 2017 222 635 A1 | 6/2019 | | |
| DE | 102017129474 A1 * | 6/2019 | ............... | H02K 1/04 |
| DE | 102017222635 A1 * | 6/2019 | ............... | H02K 1/20 |
| DE | 10 2018 219 219 A1 | 5/2020 | | |
| EP | 0 684 682 | 11/1995 | | |
| EP | 3 223 394 A1 | 9/2017 | | |

OTHER PUBLICATIONS

Neuschl (DE 102017222635 A1) English Translation (Year: 2019).*
International Search Report dated Oct. 4, 2021 by the European Patent Office in International Application PCT/EP2021/072307.

* cited by examiner

WIND TURBINE WITH AT LEAST ONE DYNAMOELECTRIC MACHINE WITH COOLING CHANNEL IN WINDING INSULATION AND CAN

CROSS-REFERENCES TO RELATED APPLICATIONS

This application is the U.S. National Stage of International Application No. PCT/EP2021/072307, filed Aug. 10, 2021, which designated the United States and has been published as International Publication No. WO 2022/034105 A1 and which claims the priority of European Patent Application, Serial No. 20190188.1, filed Aug. 10, 2020, pursuant to 35 U.S.C. 119(a)-(d).

BACKGROUND OF THE INVENTION

The invention relates to a wind turbine having at least one liquid-cooled dynamoelectric machine and to a method for producing cooling channels necessary therefor.

On account of their losses, iron losses, conductor losses, etc., dynamoelectric machines need to be cooled. Air cooling is usually no longer sufficient for efficient cooling, and so liquid cooling, in particular water cooling or oil cooling, is provided. However, for this purpose, cooling channels are required in the magnetically conductive body of the dynamoelectric machine, i.e. the stator and/or rotor. These cooling channels may need to be provided in a laminate section, as can be gathered from DE 24 62 150 or EP 0 684 682 B1. However, as a result, the magnetic flux changes during operation of the dynamoelectric machine, resulting in further losses.

DE 10 2018 219 219 A1, EP 3 223 394 A1 and DE 10 2017 222 635 A1 disclose dynamoelectric machines that have a stator and a rotor,
  wherein at least the stator is liquid-cooled,
  wherein at least the stator has a winding system which is embedded in slots of a magnetically conductive body of the stator, wherein the winding system has insulation between a conductor of the winding system and a slot wall, and wherein at least one cooling channel is provided between the insulation and the slot wall. All three solutions relate to motors for vehicle applications.

The U.S. Pat. No. 4,994,700 A discloses a dynamoelectric machine with a can between stator and rotor. Stator and rotor are cooled by oil.

In wind turbines, however, the requirements for cooling of the dynamoelectric machine acting as a generator are much greater, since maximum outputs in the MW range, tight installation space, rough conditions (offshore) and scarcely any possibilities for maintenance or repairs exist that make it necessary for the generators to operate reliably for a long time in spite of operating continuously and not to fail.

Against this background, the invention addresses the problem of creating a wind turbine having at least one dynamoelectric machine, which is easy to produce and exhibits high efficiency without the magnetic properties of the magnetically conductive body of the stator and/or rotor being impaired, and which exhibits high reliability under adverse conditions.

SUMMARY OF THE INVENTION

The stated problem is solved by a wind turbine having at least one dynamoelectric machine as set forth hereinafter. Embodiments of the invention are the subject of dependent claims. The stated problem is also solved by a production method as as set forth hereinafter.

According to the invention, one or more in particular axially extending cooling channels are now located between the slot wall and the main insulation. The cooling channel or channels are formed by recesses in the main insulation and lie in direct contact with the slot wall (for example without insulation material in between) and thus cool the metal of the teeth particularly efficiently. The recesses lie preferably in the circumferential direction, i.e. In each case between the slot wall and the conductor insulation. The expression "main insulation" means the surrounding coil leg insulation and not partial conductor insulation. The main insulation frequently comprises a plurality of partial conductors, which for their part have their own partial conductor insulation.

According to the invention, a can is provided between the stator and the rotor, with the result that different cooling principles are employed, for instance the stator can be liquid-cooled (oil, water) and the rotor gas-cooled (air). It is particularly favourable for the end windings, in which a relatively large amount of heat arises in wind turbines, to be accommodated in the liquid cooling circuit of the stator, in order to reliably dissipate the heat arising there.

The cooling channel is impressed into the main insulation of the winding system. This takes place during the production of the winding system, in which one or more conductors are provided with main insulation and in the process the main insulation is pressed with a predefined impression such that one or more recesses arise in the main insulation. These cooling-channel impressions form axially extending cooling channels in the machine together with the slot walls.

The shaping of the slot and of the magnetically conductive body, i.e. of a laminated core, can thus be maintained. Accordingly, the magnetic conditions of the magnetically conductive body also continue to remain advantageous.

The winding system is advantageously constructed with form-wound coils that are able to be produced in advance and may already be provided with the cooling-channel impressions during the production process.

In order to insert the form-wound coil radially via a slot slit, it is advantageous for the slot walls to extend parallel to one another or with a small opening angle in the direction of the air gap.

The winding system is in this case formed from conductors which form the form-wound coils. These form-wound coils are wound and insulated in advance. Once the form-wound coils have received their main insulation, they receive recesses in the region of the subsequent slot portions. Subsequently, the form-wound coils are brought into the respective shape by means of templates.

Advantageously, the recess in the main insulation is located in the central region of the conductor or of the coil. This results in guidance of the coil upon insertion into the slot and rough sealing in the direction of the air gap. The main insulation of a form-wound coil is now, as seen in cross section, in the form of a double T-shape.

The invention can be used in single-layer and multi-layer windings. As the case may be, one cooling channel or several cooling channels are brought about in a slot.

The impression in the main insulation of a form-wound coil can be undertaken on one, two, three or all sides of the coil, and this cooling-channel impression is preferably undertaken on the longitudinal sides of the coils.

Since the cooling channels, in particular the cooling-channel impressions, project axially over the magnetically conductive body, it is easier for a cooling liquid to flow in.

Since the magnetically conductive body is embodied in particular as a laminated core, previous laminate sections can be used, since the cooling channels are brought about via the cooling-channel impressions in the main insulation.

Since the magnetically conductive body is subdivided axially into at least two partial bodies, radial cooling channels that allow double-flow cooling of the stator are brought about. This improves the cooling performance and results in a more uniform temperature profile axially along the stator.

Wind turbines according to the invention having such dynamoelectric machines used as generators have a high power density while having a compact design.

BRIEF DESCRIPTION OF THE DRAWING

The invention and further advantageous configurations of the invention are explained in more detail on the basis of schematically illustrated exemplary embodiments; in the figures.

DETAILED DESCRIPTION OF PREFERRED EMBODIMENTS

Figure 1:
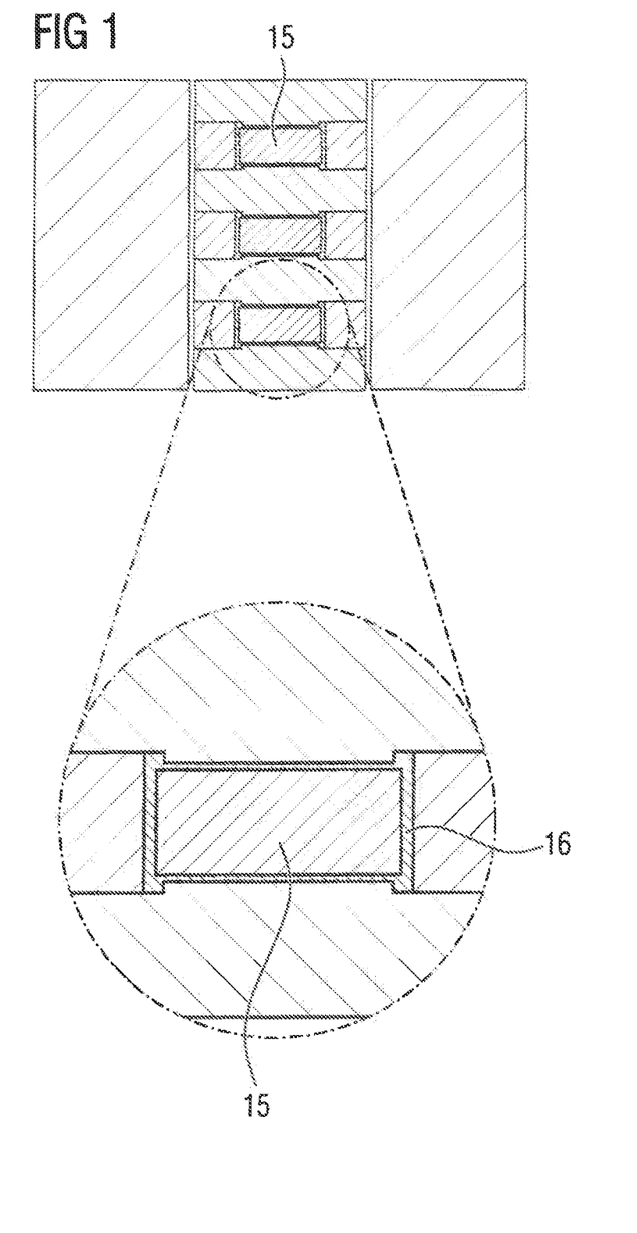
FIG. 1 shows the pressing of the main insulation with a detail view thereof.

FIG. 1 shows a method step of a basic method for producing a form-wound coil 15, the conductor of which consists of a plurality of partial conductors or of a single conductor. If partial conductors are present, these are surrounded at least in portions by partial conductor insulation, wherein the conductor as a whole, or at least in the region of the slot 18, i.e. axially within the magnetically conductive body, such as a laminated core 4, is surrounded by main insulation 16.

In order now to form a cooling channel 9 according to the invention, the main insulation 16 is compressed at predefinable regions of the main insulation via cooling-channel impression, which may be carried out by means of a stamp of a press. In the present, nonlimiting exemplary embodiment, this takes place primarily at the longitudinal sides of the form-wound coil 15. As a result of the pressing, the main insulation 16 recedes by a predefined distance in the predefined regions compared with the original extent.

Figure 2:
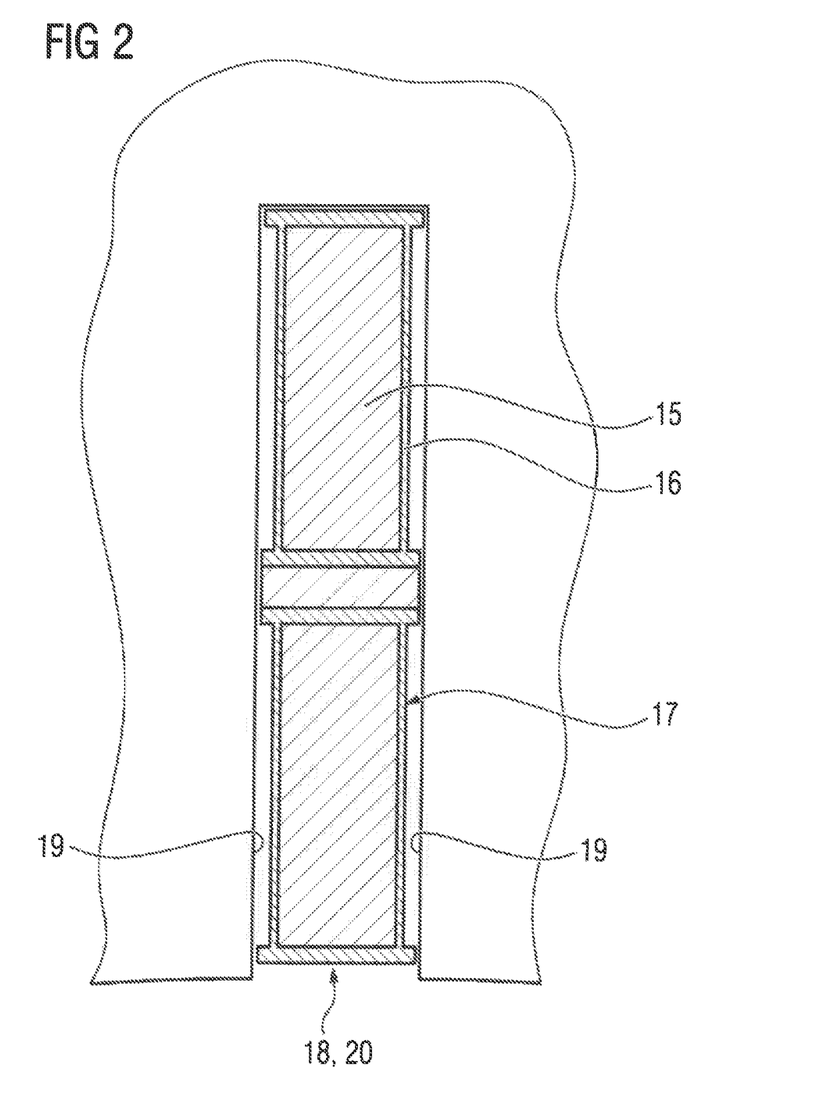
FIG. 2 shows the arrangement of a double-layer winding in a slot.
Figure 3:
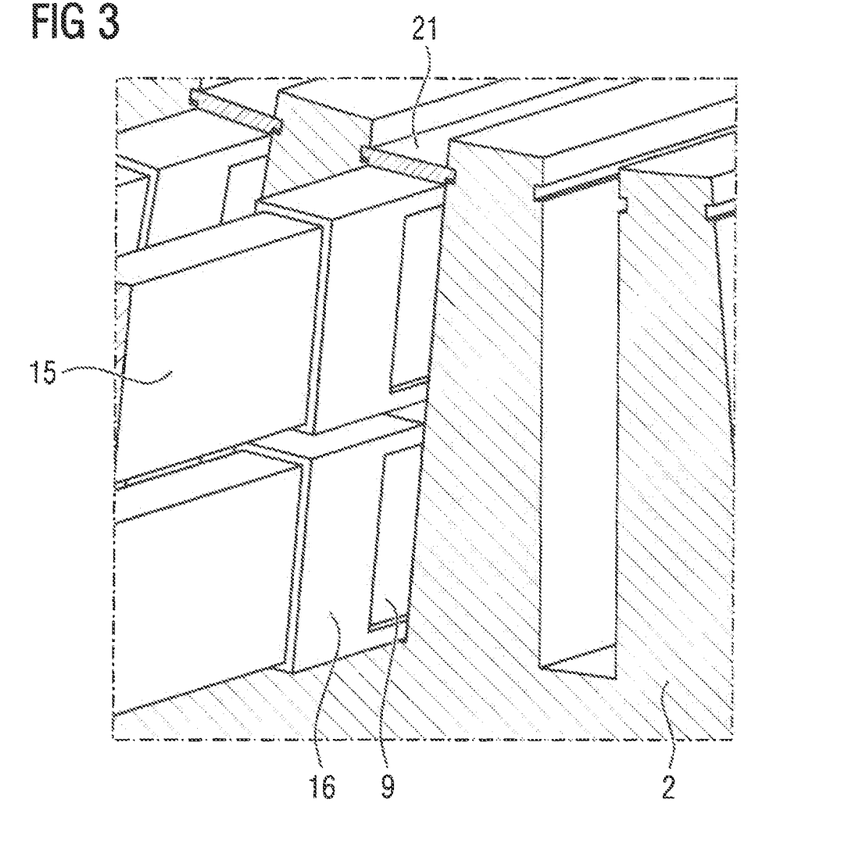
FIG. 3 shows a perspective detail view of a double-layer winding in a slot of a stator.

FIG. 2 shows by way of example a double-layer winding as is arranged in a slot 18. Here, two form-wound coils 15 are arranged radially one on top of the other in the slot 18 and are separated from one another by an intermediate element. Each form-wound coil 15 has main insulation 16, at the longitudinal sides of which the main insulation recedes as a result of the impression, as described above, so as then to bring about a distance between a slot wall 19 and the main insulation 16. This then forms an axially extending cooling channel 9 in a stator 2. The form-wound coils 15 are radially inserted into the slot 18 via a slot slit 20. The slot walls 19 are provided parallel to one another or with a small opening angle in the direction of the air gap in order to make it easier to fit the form-wound coils 15. As shown in FIG. 3, the slot slit 20 may be closed by a slot closure 21 in order to permanently position the winding system, in this case the form-wound coils 15, in the slot 18. Depending on the embodiment of the slot closure 21, this also helps to shape the magnetic field of the air gap during operation of a dynamoelectric machine 1.

As a result of the reduced radial thickness of the main insulation 16 in the predefined regions of the form-wound coil 15, the insulation is not impaired inter alia because oil cooling is used.

FIG. 3 shows a perspective detail illustration of a stator 2 having slots 18 partially occupied by a winding system. Located in the slots 18 occupied by the winding system is a double-layer winding, meaning that, as seen radially, two form-wound coils 15, as already described in FIG. 2, are arranged radially one on top of the other. The slot 18 is closed by means of a slot closure 21 and fixed in recesses of teeth of the laminated core 4. The cooling channel 9 projects axially over the end face of the laminated core 4 of the stator 2 in order to allow a liquid, in particular oil, to axially access the cooling channel 9. In this exemplary embodiment, there are thus four parallel cooling channels 9 per slot 18. Each form-wound coil 15 has two cooling-channel impressions 17 arranged on its longitudinal side, which were formed by pressing the main insulation 16.

Figure 4:
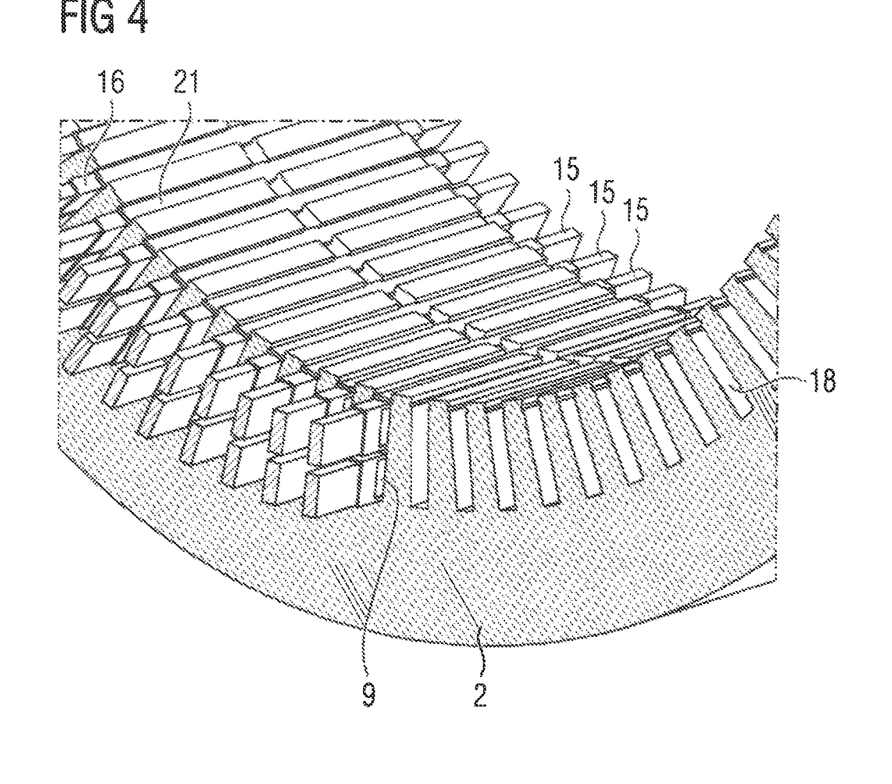
FIG. 4 shows a perspective detail view of a stator.

FIG. 4 shows a further perspective detail illustration of a stator 2 having slots 18 partially occupied by a winding system. This figure shows that the magnetically conductive body of the stator 2, for example a laminated core 4, has been subdivided into partial laminated cores 5. This brings about, between the partial laminated cores 5, radially extending slits which form radial cooling channels 10 that allow a coolant flow 22 coming from the cooling channels 9 to escape radially. The slot closure 21 is embodied to be axially continuous and thus forms a termination for the air gap, although, between the teeth of the partial laminated cores 5, there are radial cooling channels 10 or slits in which cooling liquid, for example oil, can radially escape and, as shown below, is able to be fed to corresponding heat exchangers 12.

Figure 5:
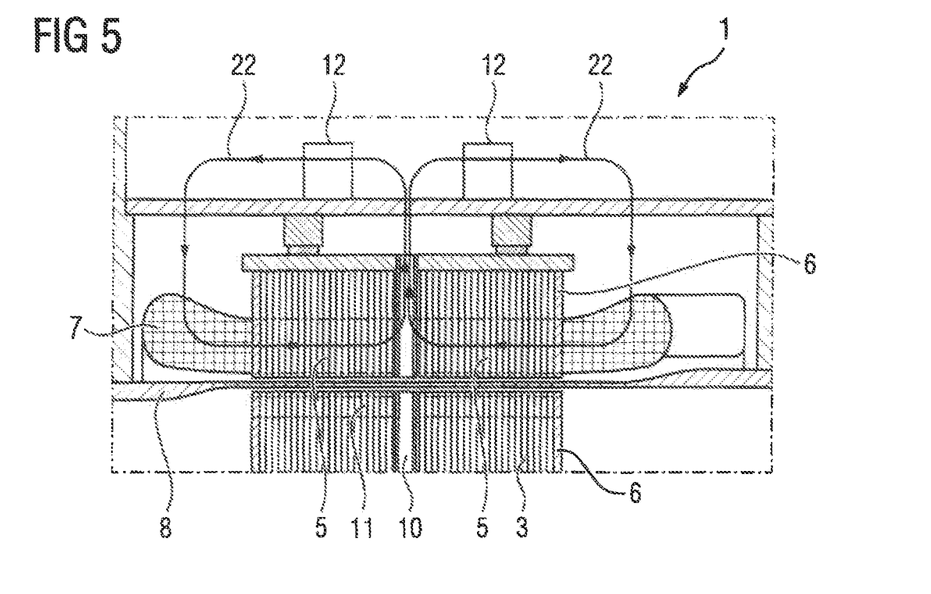
FIG. 5 shows a partial longitudinal section through a dynamoelectric machine.

FIG. 5 shows a schematic illustration of a partial longitudinal section through a dynamoelectric machine 1. In this case, a rotor 3 is spaced apart from the stator 2 by a can 8 which extends through the air gap of the dynamoelectric machine 1 and thus makes it possible to provide different cooling media for the stator 2 and the rotor 3. In this exemplary embodiment, the stator 2 is now cooled by liquid cooling. The laminated core 4 of the stator 2 is in this case constructed from two partial laminated cores 5 such that a radial cooling channel 10 is brought about between the partial laminated cores 5. The partial laminated cores 5 are fixed by pressure plates 6. End windings 7 of the winding system project axially out of the end faces of the laminated core 4. The can 8 is sealed off from further housing portions by sealing elements 13 that are not illustrated in more detail. The rotor 3 is constructed axially in one piece or likewise with partial laminated cores. In these embodiments, a cooling channel 11 extends axially through the laminated core of the rotor 3. As a result of the stator 2 and rotor 3 being separated by means of the can 8, it is now possible to equip the rotor 3 with air cooling, the rotor 3 being thermally separated from the stator 2.

The cooling liquid, in particular oil, is axially fed into the cooling channels 9 of the stator at an end face of the laminated core 4 via the end windings 7. Over the axial course of the end winding 7 and of the winding system in the slot 18, the cooling liquid heats up and is conveyed radially outwardly via the radial cooling channel 10 into heat exchangers 12. There, the cooling liquid is cooled down again and fed back into the circuit.

Figure 6:
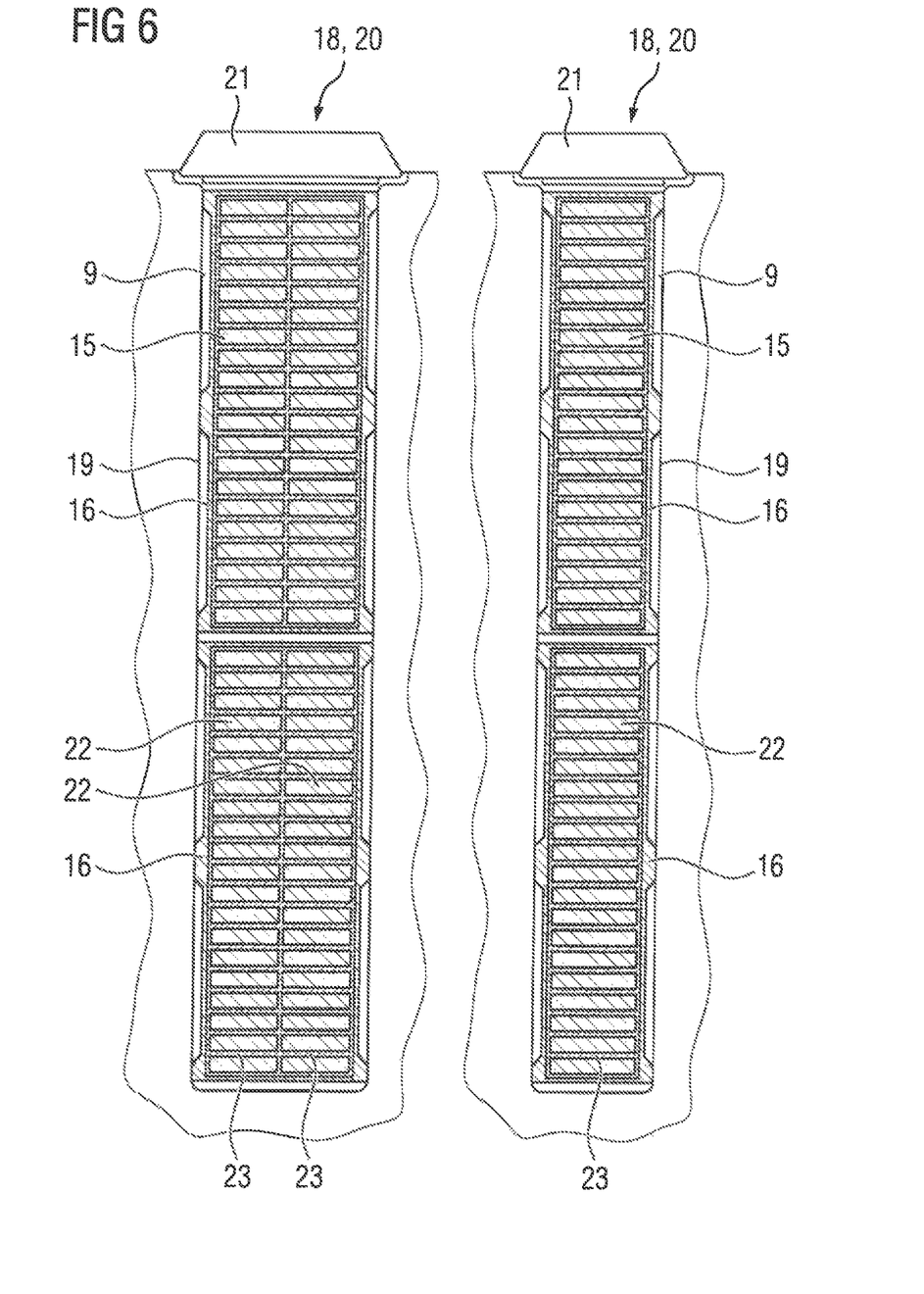
FIG. 6 shows two double-layer windings.

FIG. 6 shows by way of example two double-layer windings as are each arranged in a slot 18. Here, two form-wound coils 15 are arranged radially one on top of the other in the slot 18 and are separated from one another by an intermediate element. In contrast to the form-wound coils 15 in FIG. 2, the form-wound coils 15 consist here of a plurality of partial conductors 22 which, for their part, are entirely covered by partial conductor insulation 23 or are at least separated insulatingly from one another at the points where they lie on one another. In the left-hand variant, two partial conductors 22 are located alongside one another and many partial conductors 22 on top of one another in each form-wound coil 15. In the right-hand variant, many partial conductors 22 are located on top of one another in each form-wound coil 15, but none are located alongside one another. Each form-wound coil 15 has main insulation 16, at the longitudinal sides of which the main insulation 16 recedes as a result of the impression, as described above, so as then to bring about a distance between a slot wall 19 and the main insulation 16. This then forms an axially extending cooling channel 9 in a stator 2. The form-wound coils 15 are radially inserted into the slot 18 via a slot slit 20. The slot walls 19 are provided parallel to one another or with a small opening angle in the direction of the air gap in order to make it easier to fit the form-wound coils 15. The slot slit 20 may be closed by a slot closure 21 in order to permanently position the winding system, in this case the form-wound coils 15, in the slot 18. Depending on the embodiment of the slot closure 21, this also helps to shape the magnetic field of the air gap during operation of a dynamoelectric machine 1. It is clearly apparent that the cooling channels 9 are formed by recesses in the main insulation 16 and not by recesses in the partial conduction insulation 23.

As a result of the reduced radial thickness of the main insulation 16 in the predefined regions of the form-wound coil 15, the insulation is not impaired inter alia because oil cooling is used.

What is claimed is:

1. A wind turbine, comprising:
a dynamoelectric machine including a liquid-cooled stator and a rotor interacting with one another; said stator including a magnetically conductive body and a winding system which is embedded in slots of the magnetically conductive body and which includes a main insulation arranged between a conductor of the winding system and a slot wall and including at least one recess provided in a cooling-channel impression of the main insulation to form at least one axial cooling channel extending between the main insulation and the slot wall, so that the at least one cooling channel borders the slot wall without insulation in direct contact with the slot wall, said winding system including end windings which are also liquid-cooled; and
a can designed to separate the stator and the rotor from one another and enable different cooling media for the stator and the rotor,
wherein the winding system is constructed from form-wound coils which include coil legs having cooling-channel impressions on both sides.

2. The wind turbine of claim 1, wherein slot walls of the slots extend parallel to one another.

3. The wind turbine of claim 1, wherein the at least one cooling channel projects axially over the magnetically conductive body.

4. The wind turbine of claim 1, wherein the cooling-channel impression projects axially over the magnetically conductive body.

5. The wind turbine of claim 1, wherein the magnetically conductive body is embodied as a laminated core.

6. A method for producing at least one cooling channel of a dynamoelectric machine of a wind turbine as set forth in claim 1, the method comprising:
constructing the winding system from form-wound coils having coil legs; and
compressing with a stamp and/or a press a predefined region of the main insulation to impress the at least one cooling channel on at least one side of the coil legs of the form-wound coils.

7. The wind turbine of claim 1, wherein the coil legs have a plurality of said cooling-channel impressions on both sides.

8. A wind turbine, comprising:
a dynamoelectric machine including a liquid-cooled stator and a rotor interacting with one another; said stator including a magnetically conductive body and a winding system which is embedded in slots of the magnetically conductive body and which includes a main insulation arranged between a conductor of the winding system and a slot wall and including at least one recess provided in a cooling-channel impression of the main insulation to form at least one axial cooling channel extending between the main insulation and the slot wall, so that the at least one cooling channel borders the slot wall without insulation in direct contact with the slot wall, said winding system including end windings which are also liquid-cooled; and
a can designed to separate the stator and the rotor from one another and enable different cooling media for the stator and the rotor,
wherein the magnetically conductive body is subdivided axially into at least two partial bodies to form radial cooling channels.

9. The wind turbine of claim 5, wherein the winding system is constructed from form-wound coils.

10. The wind turbine of claim 8, wherein slot walls of the slots extend parallel to one another.

11. The wind turbine of claim 8, wherein the at least one cooling channel projects axially over the magnetically conductive body.

12. The wind turbine of claim 8, wherein the cooling-channel impression projects axially over the magnetically conductive body.

13. The wind turbine of claim 8, wherein the magnetically conductive body is embodied as a laminated core.

14. A wind turbine, comprising:
a dynamoelectric machine including a liquid-cooled stator and a rotor interacting with one another; said stator including a magnetically conductive body and a winding system which is embedded in slots of the magnetically conductive body and which includes a main insulation arranged between a conductor of the winding system and a slot wall and including at least one recess provided in a cooling-channel impression of the main insulation to form at least one axial cooling channel extending between the main insulation and the slot wall, so that the at least one cooling channel borders the slot wall without insulation in direct contact with the slot wall, said winding system including end windings which are also liquid-cooled; and a can designed to separate the stator and the rotor from one another and enable different cooling media for the stator and the rotor, wherein the winding system is constructed from form-wound coils which include coil legs having at least one cooling-channel impression on a side.

* * * * *